United States Patent [19]
Kober et al.

[11] 3,923,850
[45] Dec. 2, 1975

[54] PREPARATION OF AROMATIC ISOCYANATES

[75] Inventors: Ehrenfried H. Kober, Aschau near Krailburg, Upper Bavaria; Wilhelm J. Schnabel, Branford, Conn.

[73] Assignee: Olin Corporation, New Haven, Conn.

[22] Filed: Mar. 12, 1969

[21] Appl. No.: 806,728

[52] U.S. Cl. ............................................ 260/453 PC
[51] Int. Cl.² ........................................ C07C 118/06
[58] Field of Search ................... 260/453 P, 453 PC

[56] References Cited
FOREIGN PATENTS OR APPLICATIONS
993,704  6/1965  United Kingdom

*Primary Examiner*—Lewis Gotts
*Assistant Examiner*—Dolph H. Torrence
*Attorney, Agent, or Firm*—Donald F. Clements; James B. Haglind; T. P. O'Day

[57] ABSTRACT

In the process for preparing an organic isocyanate by reacting an organic nitro compound with carbon monoxide in the presence of a catalyst, improved recovery of the organic isocyanate is obtained when the reaction is carried out in the presence of a hydroxyl-substituted hydrocarbon. In addition, when a dinitro compound is employed as a reactant, the proportion of ortho isomers in the isocyanate product is markedly reduced.

19 Claims, No Drawings

PREPARATION OF AROMATIC ISOCYANATES

This invention relates to a novel catalyst system useful in the preparation of organic isocyanates from organic nitro compounds, and an improved method for preparing organic isocyanates.

Organic isocyanates are used extensively in the preparation of urethane foams, coatings, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catlyst, such as rhodium trichloride, palladium dichloride, iridium trichloride, osmium trichloride and the like.

Other proposed simplified techniques utilize other catalyst systems. For example, Belgian Pat. No. 672,405 entitled "Process For The Preparation Of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

An additional problem encountered in preparing organic diisocyanates, such as toluene diisocyanates, is that frequently there is a substantial quantity of ortho isomers present in commercially available dinitro compounds, such as dinitro toluene. These ortho isomers ultimately form cyclic ureas and ortho-diisocyanates, thereby decreasing the yield and contaminating the product. U.S. Pat. No. 3,317,606 discloses a method for separating these ortho, or vicinal tolylene diamines from the non-vicinal isomers by an extraction technique.

Others have attempted to upgrade the quality of the tolylene diisocyante. For example, U.S. Pat. Nos. 3,341,462 and 3,359,295 report the addition of various polyfunctional hydroxyl compounds to crude meta-, i.e., 2,4- and 2,6-tolylene diisocyanate mixtures to provide substantially solvent-free, viscous, undistilled tolylene diisocyanates.

However, there is still a need for efficiently and economically eliminating the formation of turbidity in the tolylene diisocyanate and other diisocyanates. It will be readily appreaciated that this problem, which occurs with disturbing frequency in many manufacturing processes, is a serious detriment to commercial operations wherein storage of the tolylene diisocyanate prior to use is essential.

It has been established that the formation of turbidity in tolylene diisocyanate is caused by the presence of the heretofore unkonwn ortho- isomers of tolylene diisocyanate, which polymerize to insoluble, haziness producing materials.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

It is another object of this invention to provide a process for preparing organic diisocyanates which are relatively free of ortho isomers.

A further object of the invention is to provide a novel process for preparing toluene diisocyanate which is substantially free of ortho isomers.

These and other objects of the invention will be apparent from the following detailed description thereof.

It has now been discovered that the above-mentioned objects are accomplished in the process for preparing organic isocyanates by reacting organic nitro compounds with carbon monoxide at an elevated temperature and elevated pressure in the presence of a catalyst, when the reaction is carried out in the presence of a hydroxyl-substituted hydrocarbon.

Any organic nitro compound capable of being converted to an organic isocyanate may be employed as a reactant. Generally, aromatic, cycloaliphatic, and aliphatic mono- or polynitro compounds, which may be substituted, if desired, can be reacted to form the corresponding mono- or poly-isocyanates by the novel process of this invention. The term "organic nitro compound", is used throughout the description and claims to define unsubstituted as well as substituted organic nitro compounds of the type described herein. Typical examples of suitable organic nitro compounds which can be reacted to form isocyanates include the following:

I. Aromatic Nitro Compounds a. Nitrobenzene
b. Nitronaphthalenes
c. Nitroanthracenes
d. Nitrobiphenyls
e. Bis(nitrophenyl)methanes
f. Bis(nitrophenyl)ethers
g. Bis(nitrophenyl)thioether
h. Bis(nitrophenyl)sulfones
i. Nitrodiphenoxy alkanes
j. Nitrophenothiazines

II. Nitrocycloalkanes a. Nitrocyclobutane
b. Nitrocyclopentane
c. Nitrocyclohexane
d. Dinitrocyclohexanes
e. Bis(nitrocyclohexyl)methanes

III. Nitroalkanes a. Nitromethane
b. Nitroethane
c. Nitropropane
d. Nitrobutanes
e. Nitrohexanes f. Nitrooctanes
g. Nitrooctadecanes
h. Dinitroethane
i. Dinitropropanes
j. Dinitrobutanes
k. Dinitrohexanes
l. Dinitrodecanes
m. Phenyl nitromethane
n. Bromophenyl nitromethanes
o. Nitrophenyl nitromethanes
p. Methoxy phenyl nitromethanes
q. Bis-(nitromethyl)cyclohexanes
r. Bis-(nitromethyl)benzenes All of the aforementioned compounds may be substitued with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

1. o-Nitrotoluene
2. m-Nitrotoluene
3. p-Nitrotoluene
4. o-Nitro-p-xylene
5. 2-Methyl-1-nitronaphthalene
6. m-Dinitrobenzene
7. p-Dinitrobenzene
8. 2,4-Dinitrotoluene
9. 2,6-Dinitrotoluene
10. Dinitromesitylene
11. 4,4'-Dinitrobiphenyl
12. 2,4-Dinitrobiphenyl
13. 4,4'-Dinitrodibenzyl
14. Bis(p-nitrophenyl)methane
15. Bis(2,4-dinitrophenyl)methane
16. Bis(p-nitrophenyl)ether
17. Bis(2,4-dinitrophenyl)ether
18. Bis(p-nitrophenyl)thioether
19. Bis(p-nitrophenyl)sulfone
20. Bis(p-nitrophenoxy)ethane
21. α, α'-Dinitro-p-xylene
22. 2,4,6-Trinitrotoluene
23. 1,3,5-Trinitrobenzene
24. 1-Chloro-2-nitrobenzene
25. 1-Chloro-4-nitrobenzene
26. 1-Chloro-3-nitrobenzene
27. 2-Chloro-6-nitrotoluene
28. 4-Chloro-3-nitrotoluene
29. 1-Chloro-2,4-dinitrobenzene
30. 1,4-Dichloro-2-nitrobenzene
31. 2,2-Dimethyl-1-nitrobutane
32. 1,3,5-Trichloro-2-nitrobenzene
33. 1,3,5-Trichloro-2,4-dinitrobenzene
34. 1,2-Dichloro-4-nitrobenzene
35. alpha-Chloro-m-nitrotoluene
36. 1,2,4-Trichloro-5-nitrobenzene
37. 1-Bromo-4-nitrobenzene
38. 1-Bromo-2-nitrobenzene
39. 1-Bromo-3-nitrobenzene
40. 1-Bromo-2,4-dinitrobenzene
41. α,α-Dibromo-p-nitrotoluene
42. α-Bromo-p-nitrotoluene
43. 1-Fluoro-4-nitrobenzene
44. 1-Fluoro-2,4-dinitrobenzene
45. 1-Fluoro-2-nitrobenzene
46. Pentachloro nitrobenzene
47. m-Nitrophenyl isocyanate
48. p-Nitrophenyl isocyanate
49. o-Nitroanisole
50. p-Nitroanisole
51. p-Nitrophenotole
52. o-Nitrophenetole
53. 2,4-Dinitrophenetole
54. 2,4-Dinitroanisole
55. 1-Chloro-2,4-dimethoxy-5-nitrobenzene
56. 1,4-Dimethoxy-2-nitrobenzene
57. m-Nitrobenzaldehyde
58. p-Nitrobenzaldehyde
59. Ethyl-p-nitrobenzoate
60. Methyl-o-nitrobenzoate
61. p-Nitrobenzonitrile
62. m-Nitrobenzonitrile
63. 1,4-Dinitrocyclohexane
64. Bis(p-nitrocyclohexyl)methane
65. 1-Nitro-n-hexane
66. 1,6-Dinitro-n-hexane
67. 1,4-Bis(nitromethyl)cyclohexane
68. 3,3'-Dimethoxy-4,4'-dinitro-biphenyl
69. 3,3'-Dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represents those aromatic nitro compounds and substituted aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy) alkylenes and bis(nitrophenoxy)alkyl ethers. Generally the organic nitro compounds and substituted organic nitro compounds contain between 1 to 20 carbon atoms, and preferably between about 6 and about 14 carbon atoms, especially when the organic nitro compound is an aromatic or substituted aromatic compound.

Catalyst systems which can be utilized in the novel technique of this invention include elements and compounds of elements found in Groups Ib, IIb, IIIa, IVa, IVb, Va, VIa, VIb, VIIa, VIII and the Lanthanide series of the Periodic Table shown on page 122 of *Inorganic Chemistry*, by Moeller, John Wiley and Sons, Inc. 1952. It was found that certain metals and compounds of these metals have a much greater catalytic effect than others, when compared on an equal weight basis. Those metals, in elemental or compound form, which are preferred because they show the greatest catalytic effect are as follows:

1. Palladium
2. Rhodium
3. Vanadium
4. Molybdenum

5. Ruthenium
6. Tungsten
7. Tantalum
8. Chromium
9. Niobium
10. Platinum
11. Cobalt
12. Nickel
13. Germanium
14. Tin
15. Osmium
16. Copper
17. Silver
18. Iron Other metals which may also be employed as a catalyst, either in elemental or in a compound form, but which are less effective than those listed above are as follows:

1. Aluminum
2. Scandium
3. Manganese
4. Ytterbium
5. Zinc
6. Gallium
7. Yttrium
8. Zirconium
9. Masurium
10. Lutecium
11. Cadmium
12. Indium
13. Lanthanum
14. Hafnium
15. Silicon
16. Rhenium
17. Iridium
18. Titanium
19. Gold
20. Mercury
21. Thallium
22. Lead
23. Cerium
24. Praseodymium
25. Neodymium
26. Illinium
27. Samarium
28. Europium
29. Gadolinium
30. Terbium
31. Dysprosium
32. Holmium
33. Erbium
34. Thulium Compounds of the above elements which can be utilized in accordance with the process of this invention include oxides, sulfates, nitrates, halides, carbonates, sulfides, oxalates, and the like, and preferably a compound of one of the aforesaid preferred elements. Included in the latter group are platinum oxide, platinum dioxide, platinum dibromide, platinum dichloride, platinum tetrachloride, platinous cyanide, and platinum sulfate; palladium halides such as palladium dibromide, palladium dichloride, palladium difluoride and palladium diiodide; rhodium halides such as rhodium tribromide, rhodium trichloride, rhodium trifluoride, and rhodium triiodide; palladium oxides such as palladium suboxide ($Pd_2O$), palladium monoxide (PdO), and palladium dioxide ($PdO_2$); rhodium oxides such as rhodium monoxide (RhO), rhodium sesquioxide ($Rh_2O_3$), and rhodium dioxide ($RhO_2$); chromic oxide ($Cr_2O_3$), chromic anhydride ($CrO_3$), chromium dioxide ($CrO_2$) and chromous oxide (CrO); molybdenum sesquioxide ($Mo_2O_3$), molybdenum dioxide ($MoO_2$), and molybdenum trioxide ($MoO_3$); ruthenium trichloride ($RuCl_3$), ruthenium pentafluoride ($RuF_5$), ruthenium hydroxide [$Ru(OH_2)$], ruthenium dioxide ($RuO_2$), and ruthenium tetraoxide ($RuO_4$); niobium oxide ($NbO_2$), and niobium pentoxide ($Nb_2O_5$), tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); and vanadium tetraoxide ($V_2O_4$), and vanadium pentoxide ($V_2O_5$), mixtures thereof, and the like.

In addition, carbonyls of certain elements such as nickel, cobalt, iron, rhodium, molybdenum, chromium, tungsten and ruthenium and carbonyl chlorides of certain elements such as palladium, rhodium, ruthenium and any of the aforesaid elements capable of forming carbonyls can be used as the catalyst. Mixtures of two or more of these carbonyl compounds may be employed as the catalyst system.

Furthermore, the aforesaid catalyst compositions may be used as a mixture or complex with a Lewis base. The Lewis base used as a compound of the catalyst is preferably a heteroaromatic nitrogen compound containing between five and six members in the ring, containing only nitrogen and carbon in the ring, containing no more than two nitrogen atoms in the ring, and containing at least two double bonds in the ring. Suitable compounds of this type are disclosed in *The Ring Index* by Patterson and Capell, Second Edition, American Chemical Society, 1960, and Supplements I, II and III. Derivatives of the heteroaromatic nitrogen compounds may also be utilized. The term "derivatives" when used in conjunction with heteroaromatic compounds throughout the description and claims is intended to include additions to the parent heteroaromatic ring of the following type:

I. Substituents On The Ring a. halides such as chlorine, bromine, iodine and fluorine
b. alkyl containing between 1 and 40 carbon atoms
c. aryl such as phenyl, cresyl and xylyl
d. olefinic such as allyl, vinyl
e. hydroxy
f. mercapto
g. amino
h. alkylamino
i. cyano
j. oximino
k. aldehyde
l. ethers such as aryl, alkyl, and alkenyl ethers
m. thioethers such as aryl, alkyl, and alkenyl ethers
n. carboxy
o. carbalkoxy
p. carbamyl
q. carboaryloxy
r. thiocarbamyl

II. Polycyclic Analogues a. fused benzene
b. fused cycloaliphatic
c. fused nitrogen-containing heteroaromatic III. Simple Salts IV. Quaternary Salts V. Oxides VI. Complexes With Inorganic Substances Other Than Noble Metal Halides VII. Mixtures Of Two Or More Additions Of Types I-VI Listed below are typical heteroaromatic nitrogen compounds and derivatives thereof which are suitable for use as components of the catalyst complex of this invention.

1. Five Membered Ring Containing One Nitrogen a. 1-methyl pyrrole
   b. 1-phenyl pyrrole 2. Five Membered Ring Containing Two Nitrogens a. imidazole
   b. 1-methyl imidazole
   c. pyrazole 3. Fused Benzene And Fused Nitrogen-Containing Heteroaromatic Derivatives Of Five Membered Rings Containing One Nitrogen a. indole
   b. indolenine (3-pseudoindole)
   c. 2-isobenzazole
   d. indolizine
   e. 4aH-carbazole
   f. carbazole 4. Six Membered Ring Containing One Nitrogen And Derivatives Thereof a. pyridine
   b. 2,6-dimethylpyridine
   c. 2,4,6-trimethylpyridine
   d. 4-phenylpyridine
   e. 2-vinylpyridine
   f. 2-styrylpyridine
   g. 2-bromopyridine
   h. 2-chloropyridine
   i. 3-chloropyridine
   j. 2,6-dichloropyridine
   k. 2-bromo-4-methylpyridine
   l. 2-fluoropyridine
   m. 2-allyloxypyridine
   n. 4-phenylthiopyridine
   o. 2-methoxypyridine
   p. picolinic acid
   q. nicotinic acid
   r. 2,6-dicyanopyridine
   s. pyridine-2-aldehyde (picolinaldehyde)
   t. 2-aminopyridine
   u. 4-dimethylaminopyridine
   v. diphenyl-4-pyridylmethane
   w. 4-hydroxypyridine
   x. 2-mercaptopyridine
   y. 2-oximinopyridine (picolinaldoxime)
   z. 4-tertiarybutylpyridine 5. Fused Benzene And Fused Nitrogen-Containing Heteroaromatic Derivatives Of Six Membered Ring Containing One Nitrogen a. quinoline
   b. 2-chloroquinoline
   c. 8-hydroxyquinoline
   d. isoquinoline
   e. acridine
   f. phenanthridine
   g. 7,8-benzoquinoline
   h. 4H-quinolizine
   i. naphthyridine
   j. carboline
   k. phenanthroline
   l. Benzo [h] isoquinoline
   m. Benzo [g] quinoline
   n. Benzo [g] isoquinoline
   o. Benzo [h] quinoline
   p. Benzo [f] quinoline
   q. Benzo [f] isoquinoline
   r. 1H-Benzo [de] quinoline
   s. 4H-Benzo [de] quinoline
   t. 4H-Benzo [de] isoquinoline
   u. 1H-Benzo [de] isoquinoline
   v. purine
   w. adenine
   x. pteridine
   y. 7H-Pyrazino [2,3-c] carbazole
   z. Pyrazino [2,3-d] pyridazine
   aa. 4H-Pyrido [2,3-c] carbazole
   bb. Pyrido [1',2':1,2] imidazo [4,5-b] quinoxaline
   cc. 6H-perimidine
   dd. perimidine 6. Six Membered Ring Containing Two Nitrogens and Derivatives Thereof a. pyrazine
   b. 4,6-dimethylpyrimidine
   c. 2,6-dimethylpyrazine
   d. pyridazine 7. Fused Benzene And Fused Nitrogen-Containing Heteroaromatic Derivatives Of Six Membered Rings Containing Two Nitrogens a. quinoxaline
   b. 2,3-dimethylquinoxaline
   c. phthalazine
   d. quinazoline
   e. phenazine
   f. cinnoline 8. Simple Salts Of Heteroaromatic Nitrogen Compounds Or Derivatives Thereof In Sections 1-7 Above.

a. Simple salts include nitrates, hydrohalides, sulfates and acetates of these compounds such as the following:
      1. pyridine hydrochloride
      2. 2-chloropyridine-1-oxide hydrochloride
      3. 4-chloropyridine hydrochloride
      4. 4,4'-bipyridyl dihydrochloride 9. Quaternary Salts Of Heteroaromatic Nitrogen Compounds Or Derivatives Thereof Of Sections 2 And 4-7 Above.

a. Alkyl halides, where alkyl contains 1-40 carbon atoms, acyl halides, and nitroaryl halides, such as:
      1. 1-methylquinolinium chloride
      2. laurylpyridinium chloride
      3. 1-(4-pyridyl) pyridinium chloride hydrochloride 10. Oxides Of Heteroaromatic Bases And Derivatives Thereof Of Sections 2 And 4-7 Above.

a. Oxides include oxides of quinoline, pyridine, isoquinoline and imadazole, and are illustrated by the following oxides:
  1. pyridine-1-oxide
  2. 4-bromopyridine-1-oxide
  3. 2-hydroxypyridine-1-oxide
  4. picolinic acid-1-oxide
  5. 4-methoxy pyridine-1-oxide
  6. 2-bromo-6-methylpyridine-1-oxide
  7. 2-picoline-1-oxide
  8. 4-picoline-1-oxide 11. Complexes of Heteroaromatic Nitrogen Compound With Inorganic Substances (Other Than Noble Metal Halides) of Sections 2 and 4-7 Above.

a. Complexes include pyridine, quinoline and isoquinoline complexes illustrated by the following pyridine complexes:
  1. (pyridine)$_3$ . FeCl$_3$
  2. pyridine . SO$_3$
  3. pyridine . CrO$_3$
  4. pyridine . VCl$_3$
  5. pyridine . V$_2$O$_5$
  6. pyridine . MoO$_3$ As indicated above, heteroaromatic compounds containing only nitrogen and carbon in the ring are preferably used as the Lewis base, but a heteroaromatic compound which contains only carbon and sulfur or only carbon and oxygen, or carbon and two or more elements selected from the group consisting of nitrogen, sulfur, and oxygen may also be employed as the Lewis base. Typical heteroaromatic compounds, in addition to those mentioned above, include thiophene, dibenzofuran, 2,5-diphenyloxazole, 2-mercaptobenzothiazole, thionaphthene, and the like, may also be used as the Lewis base. Preferred heteroaromatic nitrogen compounds include pyridine, isoquinoline, quinoline, and mixtures thereof.

A more complete description of nitrogen-containing heteroaromatic compounds is found in U.S. Pat. Application Ser. No. 691,211, filed Dec. 18, 1967, by Eric Smith and Wilhelm J. Schnabel. A more complete description of the heteroaromatic compounds containing sulfur, is disclosed in U.S. Pat. application Ser. No. 709,819, filed Mar. 1, 1968, by Eric Smith. A more complete description of heteroaromatic compounds containing oxygen, and complexes thereof with noble metal compounds is found in U.S. Pat. Application Ser. No. 709,813, filed Mar. 1, 1968, by Eric Smith.

The proportion of catalyst system other than the oxide of iron or other metal oxide described below is generally equivalent to between about 0.001 and about 500 percent, and preferably between about 1 and about 100 percent by weight of the organic nitro compound. However, greater or lesser proportions may be employed if desired.

When a heteroaromatic compound is used as a component of the catalyst system, the molar ratio of the heteroaromatic compound to the anion of the metal compound is generally between about 0.1:1 and about 10:1, and preferably between about 0.5:1 and about 1.5:1, but greater or lesser ratios may be employed if desired.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

Any hydroxyl substituted hydrocarbon compound can be suitably employed in the practice of this invention. The term "hydroxyl-substituted hydrocarbon" employed in the claims and specification includes any hydrocarbon compound having 1 or more reactive hydroxyl groups connected to carbon atoms having no other electrophilic substituents. Illustrative compounds include aliphatic alcohols, phenols, alkyl-substituted phenols, aromatic alcohols, polyols having 2-8 reactive hydroxyl groups per molecule, hydroxy-substituted phenyl ethers and condensation products of phenols with aldehydes and ketones.

Exemplificative of the aliphatic alcohols are those having 1-18 carbon atoms, e.g., methanol, ethanol, propanol, butanol, octanol, decanol, dodecanol, stearyl alcohol, etc. Rrepresentative phenols include those having 6-12 ring carbon atoms, e.g., phenol, naphthol, hydroquinone, pyrogallol, 4,4'-dihydroxy-diphenyl, etc. The alkyl substituted phenols containing from 7 to 14 carbon atoms include lower alkyl (i.e., alkyl having 1-4 carbon atoms) phenols having 6-10 ring carbon atoms such as ethyl phenol, i-propyl phenol, cresol, poly i-butylphenol, 2,3,4-trimethylphenol, methyl naphthol, ethyl naphthol, etc. Representative aromatic alcohols include those having 6 ring carbon atoms such as benzyl alcohol, phenyl ethanol, phenyl propanol, etc. Illustrative polyols include aliphatic diols having 1-6 carbon atoms such as ethylene glycol, propylene glycol, butylene glycol, hexylene diol, etc. as well as polyfunctional compounds having 3-8 reactive hydroxyl groups such as glycerol, pentaerythritol, methyl glucoside, sorbitol, sucrose, etc. The hydroxyl substituted phenyl ethers include p-hydroxydiphenyl ether, 3,3'-bishydroxydiphenyl ether, 3,3',4'-trihydroxydiphenyl ether, etc.

While any of the aforementioned hydroxyl-substituted hydrocarbons can be suitably employed in the process of this invention, preferred embodiments employ compounds selected from the group consisting of aliphatic alcohols having 1-12 carbon atoms, aliphatic diols having 1-4 carbon atoms, phenols having 6-10 ring carbon atoms, lower alkyl (i.e., alkyl having 1-4 carbon atoms) substituted phenols having 6-10 ring carbon atoms, and hydroxyl-substituted phenyl ethers. Ethylene glycol and phenol are particularly preferred in commerical operations for economic reasons.

Generally, the hydroxyl-substituted hydrocarbon is employed in an amount between about 0.001 and about 20 mole equivalents and preferably between about 0.005 and about 10 mole equivalents per mole of organic nitro compound. However, greater or lesser amounts can be employed, if desired.

Although the novel technique of this invention is useful in improving all of the aforesaid catalyst system, it is preferred to use a noble metal-based catalyst, especially a halide thereof.

Noble metals include ruthenium, rhodium, palladium, osmium, iridium, platinum, silver and gold. It is preferred that the metal be one of the platinum series, including a metal halide selected from the group consisting of halides of palladium, rhodium, platinum, iridium and mixtures thereof. Typical examples of suitable halides include palladous dibromide, palladous dichloride, palladous difluoride, palladous diiodide, rhodium tribromide, rhodium trichloride, rhodium trifluoride, rhodium triiodide; platnic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, ruthenium trichloride, ruthenium tetrafluoride, iridium tribromide, iridium tetrabromide, iridum dichloride, iridium trichloride, iridium tetrachloride, iridium triiodide, iridium tetraiodide, and mixtures thereof. Oxides of the noble metals may also be employed and the term "halide of a metal" is used throughout the description and claims is intended to include the above-mentioned metal halides as well as the corresponding oxides, such as palladium oxide, rhodium oxide, platinum oxide, etc., and the like.

More preferably, the catalyst is a mixture of a complex of a noble metal halide and a Lewis base, and the Lewis base is preferably one of the aforesaid nitrogen-containing heteroaromatic compounds. The use of a hydroxyl-substituted hydrocarbon in accordance with the process of this invention is particularly effective using the following catalyst systems:
1. Dichloro bis(pyridine)palladium
2. Dichloro bis(isoquinoline)palladium
3. Palladium dichloride
4. Rhodium trichloride
5. Rhodium trichloride + palladium dichloride
6. Rhodium trichloride + palladium dichloride + molybdenum oxide
7. Rhodium trichloride + palladium dichloride + vanadium pentoxide
8. Palladium dichloride + cupric chloride
9. Rhodium trichloride + isoquinoline
10. Palladium dichloride + isoquinoline
11. Rhodium trichloride + pyridine
12. Palladium dichloride + pyridine
13. Palladium dichloride + vanadium pentoxide
14. Rhodium trichloride + vanadium pentoxide The process of this invention operates effectively in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 2.0 and about 75 percent, but greater or lesser porportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 psig. After the reaction proceeds and heat is applied, the pressure may increase to as high as 30,000 psig. The preferred reaction pressure is between about 100 and about 20,000 psig. However, greater or lesser pressures may be employed if desired.

Generally the quantity of carbon monoxide in the free space of the reactor is sufficient to maintain the desired pressure as well as provide reactant for the pressure, as the reaction progresses. If desired, additional carbon monoxide can be fed to the reactor either intermittently or continuously as the reaction progresses. The reaction is believed to progress in accordance with the following equation:

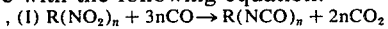
$$\text{(I)} \quad R(NO_2)_n + 3nCO \rightarrow R(NCO)_n + 2nCO_2$$

where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25°C and preferably between about 100° and about 250°C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. In all cases, however the reaction rate is markedly increased, frequently by a 2 to 10 fold increase, when an oxide selected from the group consisting of iron, molybdenum and chromium is used as a component of the catalyst system as described more fully below. Usually between one half hour and 20 hours are required to obtain the desired degree of reaction in a batch technique, but shorter or longer reaction times may be employed. In a continuous process, the reaction may be much faster, i.e., substantially instantaneous, and residence time may be substantially less than batch reaction time.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

Further improvement in the conversion and yield of organic isocyanates can be obtained by employing a catalyst system which not only contains a catalyst and a hydroxylsubstituted hydrocarbon, but also contains a third component comprised of certain metal oxides. Oxides suitable as a third component of the catalyst systems include at least one oxide of an element selected from the group consisting of iron, molybdenum and chromium. Suitable oxides of this type include chromic oxide ($Cr_2O_3$), chromium dioxide ($CrO_2$), chromic anhydride ($CrO_3$), and chromous oxide (CrO); molybdenum sesquioxide ($Mo_2O_3$), molybdenum dioxide ($MoO_2$), and molybdenum trioxide ($MoO_3$); and ferrous oxide and ferric oxide. Mixtures of two or more of these oxides may be employed as one component of the catalyst mixture. The proportion of the third component of the catalyst system, when one is employed, is generally equivalent to a weight ratio of the metal compound to the metal oxide in the catalyst system generally in the range between about 0.0001:1 and about 25:1, and preferably in the range between about 0.005:1 and about 5:1. The addition of these metal oxides is of course not necessary if they are already a component of the catalyst system.

The following examples are presented to describe the invention more fully without any intention of being limited thereby. All parts and percentages are by weight unless otherwise specified.

EXAMPLES 1–2

Into a 103 ml. stainless steel autoclave were placed 0.09 g. of palladous chloride ($PdCl_2$), 0.18 g. of vanadium pentoxide ($V_2O_5$), and 5 ml. of ortho-dichlorobenzene. The autoclave was sealed, purged with carbon monoxide, vented and then filled with carbon monoxide to a pressure of 1800 psig. The autoclave and contents were then heated at 190°C. for 1.5 hours with agitation, after which the autoclave was cooled to room temperature, vented and opened. In Examples 1 and 2, 2,4-dinitrotoluene (3 grams) and phenol (4.5 grams), were charged into the autoclave, and carbon monoxide was filled to a pressure of 2500 psig. Each reaction was performed at 190°C. for 1.5 hours with shaking. After cooling to room temperature, the autoclave was vented and the reaction mixture was filtered. Vapor phase chromatograph analyses were conducted on the filtrate under conditions which assured cleavage of phenyl urethanes into phenol and isocyanates. Listed in Table 1 is the weight percent of uncovered dinitrotoluene charged as well as the percent yields of toluene diisocyanate, nitroisocyanato toluene and total isocyanates. The percent of catalyst in the Table is based upon the weight of dinitrotoluene charged.

For purpose of comparison, Comparative Test A (CTA) was made, in which the process of Examples 1 and 2 was repeated with the exception that no phenol was added to the reaction mixture. Analyses of the reaction product in Comparative Test A are also presented in Table 1. A comparison of these results shows that when phenol was added, as in Example 1 and 2, there was a marked increase in the conversion of dinitrotoluene, and a substantial increase in the proportion of toluene diisocyanate formed in the reaction.

TABLE I

| Example | Catalyst Charge, g.(%) | | Phenol, g. | Percent Unconverted 2,4-DNT | TDI | Yield, % Mono-isocyanates | Total Isocyanates |
|---|---|---|---|---|---|---|---|
| | $PdCl_2$ | $V_2O_5$ | | | | | |
| 1 | 0.09 (3) | 0.18 (6) | 4.5 | 0 | 34.7 | 5.3 | 40.0 |
| 2 | 0.09 (3) | 0.18 (6) | 4.5 | 8 | 27.0 | 38.8 | 65.8 |
| CTA | 0.09 (3) | 0.18 (6) | 0 | 60.0 | 0.6 | 16.2 | 16.8 |

EXAMPLES 3–4

A rocking stainless steel autoclave (103 ml.) was charged with 3.0 g. of 2,4-dinitrotoluene, 5 ml. of ortho-dichlorobenzene, either 0.36 g. of palladous chloride pyridine complex or palladous chloride isoquinoline complex respectively, as indicated in Table 2, and phenol (3.0 g.) The reactor was closed, purged, and then pressurized with carbon monoxide to 2500 psig. The reaction mixture was heated to 190°C. for 1.5 hours with agitation. After cooling to room temperature, the autoclave was vented and the reaction mixture was filtered. Listed in Table 2 are the yields of toluene diisocyanate, nitroisocyanato toluene and total isocyanate, as well as unconverted 2,4-dinitrotoluene in the reaction filtrate. The percent of catalyst in the Table is based upon the weight of dinitrotoluene charged.

EXAMPLES 5–6

A 300 ml. stainless steel autoclave provided with a mechanically driven agitator, internal cooling coils, and an external heating mantle was employed in these examples. The autoclave was charged with 12.5 grams of 2,4-dinitrotoluene, palladous chloride pyridine complex (1.9 g.) or palladous chloride isoquinoline complex (2.47 g. ) respectively, as listed in Table 2, and phenol (50 g. ). Each reaction was carried out at a temperature of about 175°–190°C. with agitation, for approximately five hours at a carbon monoxide pressure ranging from 1700–2000 psig. After cooling to room temperature, the reaction products were dissolved in ortho-dichlorobenzene and filtered. Analyses by vapor phase chromatography showed the unconverted 2,4-dinitrotoluene, and percent yields of 2,4-toluene diisocyanate, nitroisocyanato toluenes and total isocyanates to be as presented in Table 2.

EXAMPLE 7

A 103 ml rocking stainless steel autoclave was charged with 3.0 g. 3,4-dinitrotoluene, 5 ml. of ortho-dichlorobenzene and 0.36 g. of palladous chloride pyridine complex. The reaction with cabon monoxide was conducted, as described for Examples 4–7. Analysis of the filtered reaction mixture by vapor phase chromatography showed that 17% of the charged 3,4-dinitrotoluene was reacted to give the corresponding diisocyanate in a 21% yield.

EXAMPLE 8

A rocking stainless steel autoclave (103 ml.) was charged with 3.0 g. of crude dinitrotoluene, consisting of 77 percent 2,4-dinitrotoluene, 19 percent 2,6-dinitrotoluene and 3.5 percent ortho isomers of dinitrotoluene (3,4 and 2,3-dinitrotoluene). The reaction with carbon monoxide was conducted in the presence of 1.2 g. of palladous chloride pyridine complex and an amount of 0.05 g. phenol. The reaction was carried out in the presence of 5 ml. of ortho-dichlorobenzene. The initial carbon monoxide pressure was 2500 psig and the reaction temperature was 200°C. After 30 minutes of reaction, the reaction mixture was filtered and the filtrate was analyzed. Analyses by vapor phase chromatography were used to determine the unconverted crude dinitrotoluene as well as the percent yield of toluene diisocyanate, nitroisocyanate toluenes and total isocyanates, as presented in Table 2.

EXAMPLE 8a

The procedure of Example 8 was repeated with the exception that the filtrate obtained by filtering the reaction product was distilled. The resulting distillate and residue were hydrolyzed with concentrated hydrochloric acid to convert ortho-isomers of tolylene diisocyanate or the reaction products from ortho-isomers of tolylene diisocyanate and phenol respectively, to methyl benzimidazolones. Subsequent analyses by ultra violet spectroscopy and mass spectroscopy revealed that the distillate was free from ortho-isomers of tolylene diisocyanates, whereas the presence of methyl benzimidazolone was detected in the residue. This Example demonstrates the marked effectiveness of hydroxyl-substituted hydrocarbons such as phenol in removing ortho-isomers of tolylene diisocyanate from the desired tolylene diisocyanate product. The resulting purified tolylene diisocyanate (meta-isomers) was free of turbidity after standing for an extended period.

TABLE 2

| Examples | Catalyst | Catalyst charge, g(%) | Phenol,g. | Percent Unconverted 2,4-DNT | TDI | Yield, % Mono-Isocyanates | Total Isocyanates |
|---|---|---|---|---|---|---|---|
| 3 | $Pd(py)_2Cl_2$ | 0.36 (12) | 3.0 | 0 | 32.1 | 40.8 | 72.9 |
| 4 | $Pd(isoqn)_2Cl_2$ | 0.36 (12) | 3.0 | 0 | 17.5 | 62.5 | 80.0 |
| 5 | $Pd(py)_2Cl_2$ | 1.9 (15.2) | 50 | 0 | 61.2 | 12.0 | 73.2 |
| 6 | $Pd(isoqn)_2Cl_2$ | 2.47 (19.8) | 50 | 0 | 19.7 | 40.0 | 59.7 |
| 8 | $Pd(py)_2Cl_2$ | 1.2 (40) | 0.05 | 0* | 30.6 | 43.7 | 74.3 |

*Unconverted crude dinitrotoluene

EXAMPLE 9

A 103 ml. stainless steel autoclave was charged with 3.0 g. of 2,4-dinitrotoluene, 5 ml. of ortho-dichlorobenzene 3.0 g. of phenol and 0.36 g. of palladous chloride. The reaction with carbon monoxide was conducted as described for Examples 3 and 4. Analysis of the filtered reaction mixture by vapor phase chromatography showed that 50% of the charged 2,4-dinitrotoluene had reacted to give a yield of 4.6 percent toluene diisocyanate plus 15.5% of monoisocyanato-nitrotoluenes.

For purposes of comparison, the procedure of Example 9 was repeated except that no phenol was added. Analysis of the filtered reaction mixture by vapor phase chromatography showed that the charged 2,4-dinitrotoluene was almost quantitatively recovered and only traces (below 1.0%) of monoisocyanato-nitrotoluenes had been formed.

Various modifications of the invention, some of which have been referred to above, may be employed without departing from the spirit of this invention.

What is desired to be secured by Letters Patent is:

1. In the process for preparing an aromatic isocyanate by reacting an aromatic nitro compound containing up to about 20 carbon atoms with carbon monoxide at an elevated temperature and an elevated pressure, the improvement which comprises carrying out the reaction in the presence of a mixture of
  I. a hydroxyl-substituted hydrocarbon selected from the groups consisting of
    a. aliphatic alcohols containing from 1 to 12 carbon atoms
    b. phenols containing from 6 to 10 carbon atoms in the ring
    c. alkyl-substituted phenols containing from 7 to 14 carbon atoms and
    d. aliphatic diols containing from 1 to 4 carbon atoms,
  II. a catalyst system selected from the group consisting of
    a. a noble metal compound selected from the group consisting of noble metal halides or noble metal oxides, wherein the noble metal is selected from the group consisting of palladium, rhodium, iridium, ruthenium or mixtures thereof,
    b. a mixture of
      1. a noble metal compound of IIa and
      2. a heteroaromatic nitrogen compound having a ring containing
        a. 5 or 6 members in the ring,
        b. only nitrogen and carbon in the ring,
        c. no more than 2 nitrogen atoms in the ring, and
        d. at least 2 double bonds in the ring,
    c. a complex of a noble metal compound of IIa with a heteroaromatic nitrogen compound of IIb(2) and
    d. a mixture of
      1. a noble metal compound of IIa, and
      2. an oxide of an element selected from the group consisting of
        a. molybdenum,
        b. vanadium,
        c. chromium and
        d. iron,
  III. wherein the proportion of said hydroxyl substituted hydrocarbon is between about 0.001 and about 20 mole equivalents per mole of said aromatic nitro compound.

2. The process of claim 1 wherein the proportion of said hydroxyl substituted hydrocarbon is between about 0.005 and about 10 mole equivalents per mole of said aromatic nitro compound.

3. The process of claim 1 wherein the proportion of said catalyst system is between about 0.001 and about 500 weight percent of said aromatic nitro compound.

4. The process of claim 1 wherein the proportion of said catalyst system is between about 1 and about 100 weight percent of said aromatic nitro compound.

5. The process of claim 1 wherein said aromatic nitro compound is selected from the group consisting of nitrobenzene, dinitrotoluene and isocyanato-nitrotoluene.

6. The process of claim 5 wherein said noble metal compound is selected from the group consisting of palladous chloride, rhodium trichloride, iridium trichloride, rhenium trichloride, platinium tetrachloride and mixtures thereof.

7. The process of claim 6 wherein said oxide of an element is selected from the group consisting of chromic oxide, chromium dioxide, chromic anhydride, chromous oxide, molybdenum sesquioxide, molybdenum dioxide, molybdenum trioxide, ferrous oxide, ferric oxide and vanadium pentoxide.

8. The process of claim 6 wherein said heteroaromatic nitrogen compound is selected from the group consisting of pyridine, isoquinoline, quinoline and mixtures thereof.

9. The process of claim 6 wherein said hydroxyl substituted hydrocarbon is selected from the group consisting of phenol and ethylene glycol.

10. The process of claim 6 wherein said hydroxyl substituted hydrocarbon is phenol and said catalyst system is a mixture of palladous chloride and vanadium pentoxide.

11. The process of claim 6 wherein said hydroxyl substituted hydrocarbon is phenol and said catalyst system is palladous chloride pyridine complex.

12. The process of claim 6 wherein said hydroxyl substituted hydrocarbon is phenol and said catalyst system is palladous chloride isoquinoline complex.

13. The process of claim 6 wherein said hydroxyl substituted hydrocarbon is phenol and said catalyst system is palladous chloride.

14. The process of claim 6 wherein said catalyst system is selected from the group consisting of
I. a mixture of
 a. a noble metal compound and
 b. a heteroaromatic nitrogen compound and
II. a complex of
 a. a noble metal compound and
 b. a heteroaromatic nitrogen compound,
III. wherein said noble metal compound is selected from the group consisting of
 a. palladous chloride,
 b. rhodium trichloride,
 c. iridium trichloride,
 d. rhenium trichloride,
 e. platinum tetrachloride and
 f. mixtures thereof and
IV. wherein said heteroaromatic nitrogen compound is selected from the group consisting of
 a. pyridine,
 b. isoquinoline,
 c. quinoline and
 d. mixtures thereof.

15. The process of claim 9 wherein the proportion of said catalyst system is between about 1 and about 100 weight percent of said aromatic nitro compound.

16. The process of claim 15 wherein the proportion of said hydroxyl substituted hydrocarbon is between about 0.005 and about 10 mole equivalents per mole of said aromatic nitro compound.

17. The process of claim 16 wherein said elevated pressure is in the range between about 30 and about 30,000 psig, said elevated temperature is in the range between about 100°C. and about 250°C., and the proportion of carbon monoxide is in the range between about 3 and about 50 moles of carbon monoxide per nitro group in said aromatic nitro compound.

18. The process of claim 17 wherein said elevated pressure is in the range between about 100°C. and 150°C. and the proportion of carbon monoxide is in the range between about 8 and about 15 moles of carbon monoxide per nitro group in said aromatic nitro compound.

19. The process of claim 18 wherein said catalyst system is selected from the group consisting of
I. a mixture of
 a. a noble metal compound and
 b. a heteroaromatic nitrogen compound and
II. a complex of
 a. a noble metal compound and
 b. a heteroaromatic nitrogen compound,
III. wherein said noble metal compound is selected from the group consisting of
 a. palladous chloride,
 b. rhodium trichloride,
 c. iridium trichloride,
 d. rhenium trichloride,
 e. platinum tetrachloride and
 f. mixtures thereof and
IV. wherein said heteroaromatic nitrogen compound is selected from the group consisting of
 a. pyridine,
 b. isoquinoline,
 c. quinoline and
 d. mixtures thereof and
V. the molar ratio of said heteroaromatic nitrogen compound to the anion of said noble metal compound is from 0.1:1 to about 10:1.

* * * * *